Figure 1:
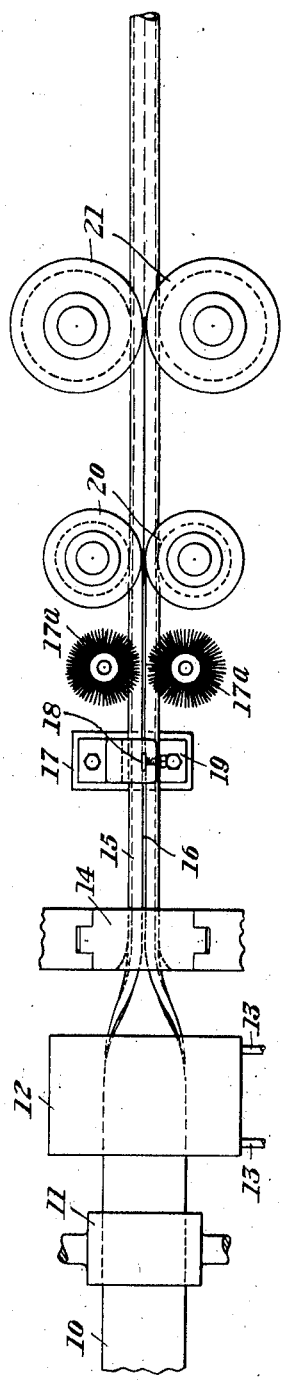

June 22, 1943.  S. W. SPECHT  2,322,671
METHOD OF MAKING WELDED TUBES
Filed Aug. 29, 1941

INVENTOR
Sigfrid W. Specht
by his attorneys
Stebbins and Blenko

Patented June 22, 1943

2,322,671

UNITED STATES PATENT OFFICE 2,322,671

METHOD OF MAKING WELDED TUBE

Sigfrid W. Specht, Youngstown, Ohio, assignor to The Youngstown Sheet and Tube Company, Youngstown, Ohio, a corporation of Ohio Application August 29, 1941, Serial No. 408,718

9 Claims. (Cl. 219—10)

This invention relates to the manufacture of welded tube of relatively small size and light to standard wall thickness, and, in particular, to the conversion of skelp, such as rolled steel strip, progressively into a tubular blank having a longitudinal seam cleft and the welding together of the edges of the cleft.

In the manufacture of electrically welded pipe and tube as now carried on, rolled skelp is formed progressively on passing through a multi-stand forming mill into a cylindrical blank with a longitudinal seam cleft, the edges of which are subsequently progressively welded together. In making pipe in the larger sizes, i. e., 6" or more in diameter and having a wall thickness of 0.2" or greater, hot-rolled plates 50' or 60' long are used as skelp. In making smaller sizes of tube, such as ¾" to 1½" in diameter with light to standard wall thickness, i. e., 0.08" to 0.125", it has been considered necessary to utilize cold-rolled strip for skelp because uniformity in cross-section and gauge is essential in order that the strip may pass continuously through the several roll stands by which it is progressively formed into a tubular blank. These roll stands are, by necessity, precision machines because they must form the strip accurately into a blank of required dimensions in order that the welding thereof may be readily effected. For these reasons it has been the practice to limit the tolerances in the dimensions of the strip which has been used as skelp in electric welding plants, to approximately 0.002" plus or minus. These tolerances can be met only by cold-rolled strip.

It has also been generally conceded that the use of cold-rolled skelp is necessary because it is free from hot-mill scale, rolled-in scale particles, oxides or other impurities, which are known to affect the weld adversely, resulting in only partial welding or the formation of a weak weld which results in failure of the finished tube under test. It is evident, from the foregoing, that electrically welded tube in the smaller sizes as made at present is a high-grade and costly product.

I have invented a novel process of making electrically welded tube in the smaller sizes, whereby I am enabled to utilize as skelp, hot-rolled strip as it comes from the last stand of a continuous mill, for example, the only further preparatory step necessary being the shearing of the material to proper width. Hot-rolled strip, of course, is coated with a continuous layer of oxide. It also usually has numerous separate particles of hot-mill scale rolled into the surfaces thereof. It is not, furthermore, nearly so uniform in gauge as the cold-rolled skelp used heretofore. Despite such conditions, I am able, by certain special operations and provisions in the formation of the skelp into a blank and the welding of the blank to form a tube, to produce a satisfactory product. Since the cost of hot-rolled strip is roughly only one-third that of cold-rolled strip of like size and gauge, it will be apparent that the invention produces welded tube in the smaller sizes at a much lower cost than has been possible heretofore.

In a preferred embodiment and practice of the invention, I feed hot-rolled skelp with its oxide coating, through a continuous heating means and then through a forming bell, die, or stand of rolls which serves not only to form up the flat skelp into a tubular blank but also to detach the oxide coating from the skelp. In other words, the forming means serves also as a mechanical scale-removing means, obviating the necessity for the usual pickling. I then subject the edges of the cleft of the resulting blank to a cleaning and trimming operation preparatory to welding. The blank is then passed through a final forming means such as a roll-stand. I then forward the blank past contact electrodes, preferably by applying traction in a zone spaced from that in which the electrodes engage the blank. When sufficiently heated by the passage of current delivered to the electrodes, the cleft edges are pressed together and finally welded.

Figure 2:
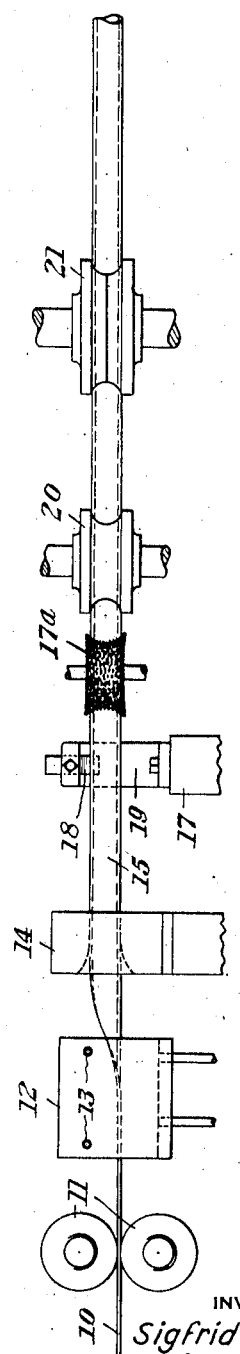

Further details, novel features and advantages of the invention will become apparent during the following complete description and explanation referring to the accompanying drawing illustrating diagrammatically the preferred embodiment and practice outlined above. In the drawing:

Figure 1 is a plan view showing the several steps of the operation and indicating diagrammatically the apparatus whereby they are performed; and Figure 2 is a side elevation.

Referring now in detail to the drawing, hot-rolled skelp 10 in the form of coiled strip as it comes from the mill with its surfaces coated with oxide and without any preliminary treatment except shearing to width, is fed by pinch rolls 11 through a continuous heating apparatus 12. This is preferably an electric induction heating device of any suitable type and is preferably provided with connections 13 for maintaining therein a non-oxidizing atmosphere. The skelp is heated by the apparatus 12 to a temperature of about 1800° F. at which it is sufficiently softened to facilitate the formation thereof into a tubular blank. When welding low-carbon steel skelp, the heating means may be required only while entering the leading end of a coil of strip into the forming means and may thereafter be shut off. When welding alloy-steel skelp, however, it is preferable to use the heating means continuously.

On emerging from the heating apparatus 12, the skelp enters a forming device 14 illustrated in the drawing as a bell or die. It may, however, comprise a stand of suitable forming rolls, instead. The principal function of this apparatus, of course, is to bend the edges of the skelp upwardly and toward each other progressively forming the skelp into a tubular blank 15 having a longitudinal seam cleft 16 therein. The forming apparatus, however, performs other functions as well.

As indicated in the drawing, the forming apparatus is placed quite close to the heating apparatus. The dimension of the die 14 measured along the line of skelp travel furthermore is rather small. This means that the conversion of flat skelp into tubular form occurs within a relatively short time. This results in a considerable increase in the hardness of the skelp which is desirable because it gives added stiffness or rigidity to the blank 15 facilitating the further travel thereof through the remaining apparatus as will be shortly described. The degree of hardness added to the skelp may be controlled by adjusting the distance between the heating apparatus 12 and the forming die 14 or by changing the temperature at which the skelp is delivered to the die.

The die 14 serves still another purpose, viz., it acts as a chill block or quench upon the heated skelp entering it. By this effect and the physical deformation of the skelp, the oxide coating or layer of scale normally adhering to the surface of the hot-rolled steel strip is fragmented, loosened, and thoroughly detached. This operation of the forming die may be described as a mechanical scale removal, as contrasted with the usual chemical method of removing scale by pickling. Since the heating of the skelp in the apparatus 12 is carried out in a non-oxidizing atmosphere, little or no opportunity is presented for further oxidation of the material.

After the skelp 10 has been converted into a tubular blank 15 by the heating apparatus 12 and the forming device 14, the blank is prepared for welding by passing it through a device 17 effective to clean and trim the edges of the seam cleft 16. The device 17 may conveniently comprise a cutting tool 18 having edges adapted to engage both edges of the seam cleft to remove any oxide or scale particles adhering to the surface thereof. The tool 18 is mounted in a suitable supporting standard 19. Wire brushes 17a serve to brush off loosened scale particles from the blank prior to welding.

After passing the cleaning and trimming device 17, the blank 15 passes between driven rolls 20 which perform several functions. In the first place, the rolls 20 provide the traction necessary to feed the blank between the welding electrodes to be described shortly. In the second place, the rolls 20 are adjusted to exert a predetermined pressure on the blank, thereby effecting a final sizing of the blank and a slight working of the cleft edges preparatory to welding. As indicated in the drawing, the rolls 20 cause the closing of the longitudinal cleft 16.

The welding electrodes indicated at 21 preferably comprise a pair of split, grooved rolls similar to the rolls 20 except that their upper halves are composed of a highly conductive material such as copper whereas the rolls 20 are preferably composed of stronger material such as hardened steel. The electrodes are preferably driven solely by the friction of the advancing blank and are connected to a suitable source of welding current. They may, however, be driven by a suitable motor, if desired. The upper halves of the electrodes serve in the known manner, to cause the flow of welding current across the closed cleft 16 in the tube blank, thereby heating the edges of the cleft to welding temperature. The electrodes as a whole force the heated edges together sufficiently to form a good weld. Instead of the horizontal electrodes shown, vertical electrodes may be used.

Any suitable auxiliary equipment may be installed after the electrode 21, such as bead rollers or trimmers, internal mandrels or the like, such as are usually employed in connection with tube-welding apparatus. The finished tube may be cut into any desired lengths while traveling by known severing apparatus. The invention is particularly adapted to the manufacture of tube having a relatively thin wall, the skelp for which may be obtained in long lengths, i. e., in coils of strip. Successive coils may readily be welded together for continuity of operation.

It will be apparent from the foregoing description and explanation that the invention is characterized by numerous advantages over the prior practice in the manufacture of electrically welded tube. In the first place, I utilize as a starting material, hot-rolled skelp which costs only about one-third as much as the cold-rolled skelp, the use of which has previously been considered necessary. Secondly, I dispense with a large number of precision roll stands used heretofore for forming the skelp into a tubular blank. Since these machines are quite expensive, their omission makes possible a further reduction in overall cost. In addition, the actual operations of forming, edge treating, and welding, as carried out according to my invention involve costs lower than corresponding operations as previously conducted on cold-rolled material, and certain operations such as pickling are eliminated.

The product of my invention is equal to that made from cold-rolled skelp in respect to all physical properties with the exception that its surface is less smooth. This is not, however, a disadvantage because, for many applications, the smooth bright surface of the cold-rolled material is not essential. In certain applications, furthermore, the slightly roughened appearance of the product of my invention is a distinct advantage, i. e., where the tube is to be painted, enamelled, galvanized or the like, because the surface roughness produces a better bond with the coating material.

A further advantage of the invention is that the welding electrodes, since they do not drive the tube blank, are not subject to as much wear and tear as would otherwise be the case, resulting in burning or pitting and the resulting necessity for frequent adjustment as has been encountered under the previous practice. Such difficulties have resulted partly from the fact that the electrodes have heretofore been relied on to do a large part of the work of finally forming and sizing the blank. I utilize separate rolls particularly suited for this function and thereby further reduce the wear on the electrodes.

Although I have described and illustrated but a preferred embodiment and practice of the invention, it will be understood that changes in the structure and operations disclosed may be made without departing from the spirit of the invention or the scope of the appended claims.

I claim:

1. In a method of making metal tube having a diameter of about 1½" or less and a wall thickness of about 0.125" or below, the steps including longitudinally advancing hot-rolled strip of suitable width and thickness having an adherent coating of oxide thereon, progressively heating the strip throughout substantially its entire width to a temperature at which it is appreciably softened, progressively forming the strip into a cylindrical blank with a longitudinal seam cleft while simultaneously quenching the strip, thereby fragmenting and detaching the oxide coating from substantially the entire surface area of the strip, trimming and brushing the edges of the seam cleft and uniting them by progressive electric-resistance welding.

2. In a method of making metal tube having a diameter of about 1½" or less and a wall thickness of about 0.125" or below, the steps including longitudinally advancing hot-rolled strip of suitable width and thickness having an adherent coating of oxide thereon, progressively heating the strip throughout substantially its entire width to a temperature at which it is appreciably softened, progressively forming the strip into a cylindrical blank with a longitudinal seam cleft and quenching it at a rate such as to fragment and detach the oxide coating from substantially the entire surface area of the strip, trimming and brushing the edges of the cleft to prepare them for welding and uniting them by progressive, electric-resistance welding.

3. In a method of making metal tube having a diameter of about 1½" or less and a wall thickness of about 0.125" or below, the steps including longitudinally advancing hot-rolled strip of suitable width and thickness having an adherent coating of oxide thereon, forming the strip progressively into a cylindrical blank with a longitudinal seam cleft at a rate such as to fragment and detach the oxide coating from substantially the entire surface of the strip, and uniting the edges of the cleft by progressive, electric-resistance welding.

4. In a method of making metal tube, the steps including longitudinally advancing hot-rolled strip of suitable width and thickness having an adherent coating of oxide thereon, progressively forming the strip into a cylindrical blank having a longitudinal seam cleft, at a rate sufficient to effect mechanical descaling of the strip by fragmentation and detachment of the oxide coating, preparing the cleft edges for welding and progressively uniting them by electric-resistance welding.

5. In a method of making welded tube, the steps including progressively heating oxide-coated, hot-rolled skelp throughout its entire width to facilitate bending, continuously forming the skelp while still at elevated temperature into a tube blank with a longitudinal seam cleft, thereby breaking and largely removing the oxide coat from substantially the entire surface area of the skelp, cleaning the edges of the seam cleft, moving the blank past contact electrodes and thereby welding the edges of the seam cleft together.

6. In a method of making welded tube, the steps including progressively heating oxide-coated, hot-rolled skelp while in flat form throughout its entire width to facilitate bending, forming the heated skelp in a single bending pass into a cylindrical blank with a longitudinal seam cleft, thereby breaking and largely removing the oxide coat, moving the blank edges past contact electrodes and welding them together.

7. The method defined by claim 5 characterized by chilling the blank substantiailly simultaneously with the forming thereof.

8. In the method of making welded tube, the steps including progressively heating oxide-coated, hot-rolled skelp throughout its width to facilitate bending, forming the skelp into a cylindrical blank with a longitudinal seam cleft in a single bending pass, thereby removing the oxide coat from substantially the entire surface area of the sklep, moving the blank edges past contact electrodes to heat them to welding temperature and welding them together.

9. In a method of making welded tube, the steps including forming skelp in a single pass into a cylindrical blank having a longitudinal seam cleft and simultaneously hardening the skelp sufficiently to effect an appreciable increase in the stiffness of the resulting blank, moving the blank past contact electrodes and welding the edges of the seam cleft together.

SIGFRID W. SPECHT.